United States Patent
Viswanathan et al.

(10) Patent No.: US 10,128,744 B1
(45) Date of Patent: Nov. 13, 2018

(54) SINGLE AND MULTI-PHASE DC-DC CONVERTER MODE CONTROL

(71) Applicant: Texas Instruments Incorporated, Dallas, TX (US)

(72) Inventors: Ananthakrishnan Viswanathan, Allen, TX (US); Joseph Michael Leisten, Cork (IE); Brent McDonald, Murphy, TX (US); Philomena Cleopha Brady, Corinth, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/840,318

(22) Filed: Dec. 13, 2017

(51) Int. Cl.
    *H02M 1/42* (2007.01)

(52) U.S. Cl.
    CPC ............ *H02M 1/42* (2013.01); *H02M 1/4208* (2013.01)

(58) Field of Classification Search
    CPC .. H02M 1/4225; H02M 1/4258; H02M 1/425; H02M 2001/4283; H02M 1/12; H02M 3/155; H02M 3/158; H02M 1/4208; H02M 7/217; H02M 3/1584; H02M 3/285; H02M 1/42; G05F 1/70
    USPC ..................................... 323/222; 363/65, 89
    See application file for complete search history.

(56) References Cited

U.S. PATENT DOCUMENTS

| | | | |
|---|---|---|---|
| 7,872,456 B2 | 1/2011 | Li et al. | |
| 8,773,097 B2 | 7/2014 | Franklin et al. | |
| 8,884,598 B2 | 11/2014 | Harrison | |
| 8,937,469 B2* | 1/2015 | Clark | G05F 1/70 323/207 |
| 9,001,531 B2* | 4/2015 | Chen | G05F 1/468 323/222 |
| 9,124,177 B2 | 9/2015 | Zhu et al. | |
| 9,240,720 B2 | 1/2016 | Tateishi et al. | |
| 2008/0002439 A1 | 1/2008 | Allinder | |
| 2008/0272748 A1* | 11/2008 | Melanson | H02M 1/4225 323/207 |
| 2012/0032748 A1 | 2/2012 | Li et al. | |
| 2014/0225577 A1 | 8/2014 | Ivanov et al. | |
| 2014/0307478 A1 | 10/2014 | Leisten | |

(Continued)

OTHER PUBLICATIONS

J.B. Yang et al., "Comparisons between CRM and CCP PFC", Energy and Power Engineering, Jul. 2013, pp. 864-868.

(Continued)

*Primary Examiner* — Nguyen Tran
(74) *Attorney, Agent, or Firm* — Tuenlap D. Chan; Charles A. Brill; Frank D. Cimino (57) ABSTRACT

Disclosed examples include methods and control circuits to operate a single or multi-phase DC-DC converter, including an output that turns a first switch on for a controlled on time and then turns the switch off for a controlled off time in successive control cycles, as well as a PWM circuit that computes a threshold time value corresponding to a predetermined peak inductor current and a duty cycle value, and computes a first time value according to an error value for a subsequent second switching control cycle. The PWM circuit sets the on time to the first time value to operate in a critical conduction mode for the second switching control cycle when the first time value is greater than or equal to the threshold time value, and otherwise sets the controlled on time to the threshold time value for discontinuous conduction mode operation in the second control cycle.

20 Claims, 6 Drawing Sheets

(56) References Cited

U.S. PATENT DOCUMENTS

| | | |
|---|---|---|
| 2014/0354079 A1 | 12/2014 | Bailey et al. |
| 2014/0361755 A1 | 12/2014 | Tateishi et al. |
| 2015/0103566 A1 | 4/2015 | Keogh et al. |
| 2015/0326121 A1 | 11/2015 | Torres et al. |
| 2016/0036319 A1 | 2/2016 | Katsumata |
| 2016/0099639 A1 | 4/2016 | Leisten et al. |
| 2016/0172965 A1 | 6/2016 | Suryanarayana et al. |
| 2017/0126124 A1 | 5/2017 | Santoro et al. |

OTHER PUBLICATIONS

"UCC28063 Natural Interleaving™ Transition-Mode PFC Controller With Improved Audible Noise Immunity" Texas Instruments, UCC28063, Sep. 2011, Revised Nov. 2016, 45 pages.

\* cited by examiner

SINGLE AND MULTI-PHASE DC-DC CONVERTER MODE CONTROL

BACKGROUND

Power factor correction (PFC) circuits are used to control the relative phase relationship between voltage and current of a load to an AC supply. PFC circuits may include an initial DC-DC switching converter referred to as a PFC pre-converter that receives a rectified line voltage and generates a DC output voltage while also providing power factor correction. A subsequent DC-DC converter may be included to provide a regulated DC voltage to a load circuit. The PFC DC-DC can be operated by pulse width modulated control signals in a critical conduction mode (CRM or CrCM, also referred to as transition mode (TM)), or in a discontinuous conduction mode (DCM). CRM operation suffers from high switching loss and increased operating frequency at light loading conditions. To improve light loading efficiency, control can be shifted to DCM operation at light loads, while maintaining power factor control. Measuring the peak current of a boost converter inductor to trigger transition from CRM to DCM requires an added sense resistor and an extra integrated circuit pin, which is expensive and increases power loss. Separate interleaved CRM boost converters can be used for higher power applications, but interleaved operation of two converters using DCM control for light loads increases cost and complexity with respect to phase synching and can lead to degraded EMI performance and increased audible noise.

SUMMARY

Disclosed examples include single and multi-phase DC-DC converters as well as operating methods and control circuits. An example control circuit includes an output that turns a first switch on for a controlled on time and then turns the switch off for a controlled off time in successive control cycles. The control circuit further includes a PWM circuit that computes a threshold time value corresponding to a predetermined peak inductor current and a duty cycle of a first switching control cycle. The PWM circuit computes a first time value according to an error value for a subsequent second switching control cycle, and sets the on time to the first time value to operate in a critical conduction mode for the second switching control cycle when the first time value is greater than or equal to the threshold time value, and otherwise sets the controlled on time to the threshold time value for discontinuous conduction mode operation in the second control cycle. In certain examples, the PWM circuit causes the first switch control output to turn the first switch off upon a first zero current detection signal indicating that the inductor current in the critical conduction mode when the first time value is greater than or equal to the threshold time value.

Further aspects of the present disclosure provide a control circuit to operate a DC-DC converter, including first and second switch control outputs configured to provide switching control signals with controlled on and off times to corresponding switches, and a phase control circuit configured to operate the first and second switches concurrently in a first mode for dual phase critical conduction mode operation while an output load current is above a first threshold. The phase control circuit switches to single phase critical conduction mode operation in response to the output load current transitioning below a lower second threshold. The phase control circuit operates the first switch in a third mode for single phase discontinuous conduction mode operation in response to the output load current transitioning below a still lower third threshold. The phase control circuit changes to single phase burst mode operation to skip at least one of the successive switching control cycles in response to the output load current transitioning below a fourth threshold, where the fourth threshold is less than the third threshold.

An example method is disclosed to operate a DC-DC converter, including turning a first switch on for a controlled on time, and turning the first switch off for a controlled off time in successive switching control cycles to control transfer of power between an input node and an output node. The method also includes computing a threshold time value corresponding to a predetermined peak inductor current and a duty cycle value for a first switching control cycle, and computing a first time value according to an error value for a subsequent second switching control cycle. The method further includes setting the controlled on time and the controlled off time for the second switching control cycle for critical conduction mode operation or discontinuous conduction mode according to the threshold time value and the first time value.

DETAILED DESCRIPTION

The present disclosure provides apparatus and methods for low cost transitioning between CRM to DCM operation using peak current calculations, and multi-phase DC-DC converter control to mitigate or overcome the above mentioned shortcomings. The disclosed concepts can be employed in a variety of different DC-DC conversion applications, including without limitation PFC pre-converters using single switch boost converter topologies with a controlled low side switch and an inductor connected to a switching node. Like reference numerals are used below and in the drawings to refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " As used herein, the terms "couple", "coupled" and "couples" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 1:
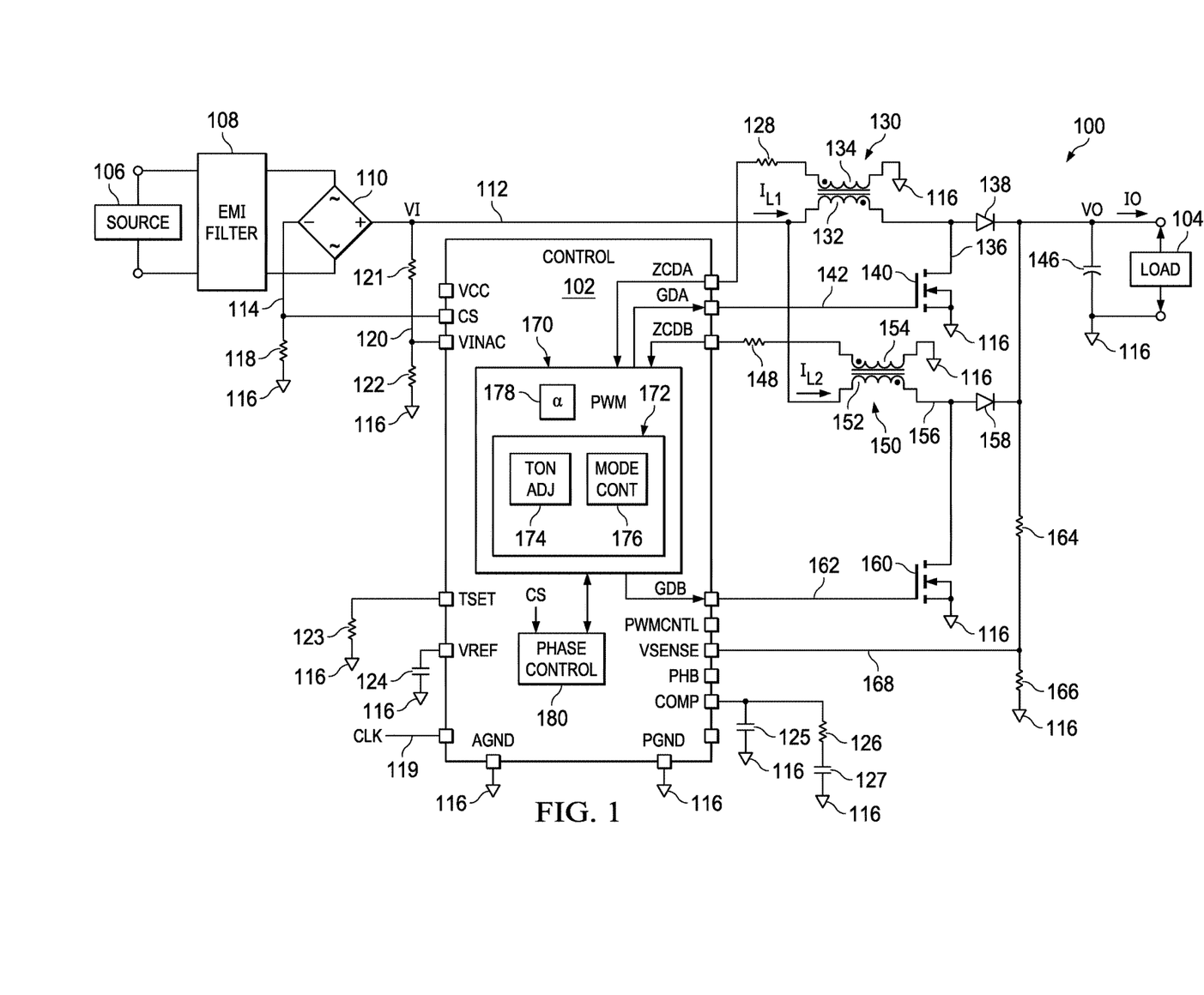
FIG. 1 is a schematic diagram of a dual phase DC-DC converter with a control circuit implemented as a controller integrated circuit (IC) to switch between critical conduction mode (CRM) and discontinuous conduction mode (DCM) according to peak current.

FIG. 1 shows a dual phase DC-DC converter or power conversion circuit 100 that includes a control circuit 102 implemented as a controller integrated circuit (IC) 102, and switching circuitry to provide regulated power to a load 104. The control circuit 102 in certain examples switches between critical conduction mode (CRM) and discontinuous conduction mode (DCM) according to a critical on-time threshold related to inductor peak current and a duty cycle value computed on a cycle-by-cycle basis. The control circuit mitigates or avoids the previous efficiency penalties at light loading conditions for single and multi-phase converter configurations. The inventors have appreciated that enforcing a minimum on time in generating the switching control signal or signals enforces a minimum peak inductor current. The illustrated implementations provide a simple way to calculate this current with just one mathematical operation without requiring an external current sense resistor. In this regard, conventional PFC pre-converter designs suffer from significant switching losses at light load due to increased frequency CRM operation. In contrast, disclosed examples provide intelligent switching to DCM operation to mitigate flight loading operating frequency, while ensuring that the threshold amount of inductor peak current is used.

As shown in FIG. 1, the illustrated conversion system 100 includes an AC power source 106, which can be a single phase or a multiphase source in various implementations. AC input power is delivered through an EMI filter 108 to a rectifier circuit 110. The rectifier circuit 110 includes positive and negative (+ and −) outputs that deliver a DC converter voltage input signal VI at a converter input node 112 (+) control circuit 102 relative to a node 114 (−). In one example, the node 114 is connected to a ground reference node 116 through a sense resistor 118, and the control circuit 102 includes an input connected to the node 114 to receive a current sense signal CS that represents the current flowing from the input node 112 through the converter 100. In the illustrated example, a first resistive divider circuit is formed by resistors 121 and 122 to provide an AC input sense signal VINAC from an intermediate node 122 and input of the control circuit 102. The first divider resistor 121 is connected between the input node 112 and the node 120. The control circuit 102 detects the presence or absence of AC input power from the source 106 according to the AC input sense signal VINAC. The second divider resistor 122 is connected between the node 120 and the reference node 116. The control circuit 102 also includes an input to receive a bias supply input voltage signal VCC, and an input to receive a timing set signal TSET from a resistor 123 connected between the controller input and the reference node 116.

A capacitor 124 is connected between a reference voltage signal output of the control circuit 102 and the reference node 116 to set a reference voltage signal VREF. The control circuit 102 compares an output voltage feedback signal VSENSE with the reference voltage signal VREF to generate an error signal COMP used in closed loop PWM operation to regulate an output voltage VO and/or an output current IO provided to the load 104. The control circuit 102 includes an error signal output connected to the reference node 116 by a capacitor 125 and a series circuit including a resistor 126 and a capacitor 127 to stabilize the error signal COMP.

The control circuit 102 includes first and second output circuits to control associated switches in a dual phase boost converter configuration. The first phase circuitry includes a first transformer 130 with a primary winding 132 that forms a first boost converter inductor connected between the input node 112 and a first switching node 136. A secondary winding 134 provides a first zero current detection signal ZCDA to an input of the control circuit 102 through a resistor 128. The control circuit 102 uses the zero current detection signal ZCDA to detect transition of a first inductor current $I_{L1}$ to a predetermined threshold value (e.g., zero) for control in CRM operation of the buck converter 100. A first switch 140 is connected between the first switching node 136 and the reference node 116. The control circuit 102 includes a first switch control output 142 configured to provide a first switching control signal GDA to operate the first switch 140 as a low side switch of the boost DC-DC converter 100. In the illustrated dual phase converter 100, a first auctioneering diode 138 is connected between the first switching node 136 and a converter output node 144. The diode 138 allows the first inductor current $I_{L1}$ to flow through the inductor (primary winding) 132 to the output node 144 to establish the output voltage VO across an output capacitor 146.

The second phase circuitry includes a transformer 150 with a primary winding 152 that forms a second boost converter inductor connected between the input node 112 and a second switching node 156. A secondary winding 154 provides a second zero current detection signal ZCDB to an input of the control circuit 102 through a resistor 148 to detect transition of a second inductor current $I_{L2}$ to a predetermined threshold value. A second switch 160 (e.g., NMOSFET) is connected between the second switching node 156 and the reference node 116. A second switch control output 162 provides a second switching control signal GDB to operate the second switch 160 as a second low side switch of the converter 100. A second auctioneering diode 158 is connected between the second switching node 156 and the output node 144 to allow the second inductor current $I_{L2}$ to flow from the inductor 152 to the output node 144.

The switches 140 and 160 in one example are n-channel MOSFET transistors operated according to active high switching control signal GDA and GDB. Other switches can be used, such as p-channel FETs, NPN or PNP bipolar transistors, etc. The control circuit 102 operates the switches 140 and 160 to regulate the output voltage VO according to the reference voltage signal VREF and a feedback signal VSENSE. The feedback signal represents the output voltage signal VO, and is generated at an input node 168 by a resistive divider circuit including resistors 164 and 166 connected between the output node 144 and the reference node 116. In operation, the first switch control output 142 provides a first switching control signal GDA in a first state HIGH to turn a first switch 140 on for a controlled on time TON and then provide the first switching control signal GDA in a second state LOW to turn the first switch 140 off for a controlled off time TDC+TDCM in successive switching control cycles to control transfer of power between an input node 112 and an output node 144. When operating in dual or two-phase modes, the second switch control output 162 provides the second switching control signal GDB in a first state HIGH to turn a second switch 160 on for the controlled on time TON and then provide the second switching control signal GDB in a second state LOW to turn the second switch 160 off for the controlled off time TDC+TDCM in the successive switching control cycles. In one example, the control circuit 102 provides the first and second switching control signals GDA and GDB 180 degrees out of phase with one another for interleaved operation, although not a strict requirement for all possible implementations.

The control circuit 102 further includes a pulse width modulation PWM circuit 170 with a processing circuit 172. The processing circuit 172 includes an on time adjustment component or circuit 174 and a mode control component or circuit 176. The processing circuit 172 stores a predetermined value 178 (a) used for switching between CRM and DCM operating modes. In certain examples, the control circuit 102 also includes a phase control circuit or component 180. The control circuit 102 in one example includes an input 119 to receive a clock signal CLK from an external source (not shown) to operate the processing circuit 172 and the various components thereof. In another possible example, the control IC 102 includes an internal clock signal source (not shown).

Figure 2:
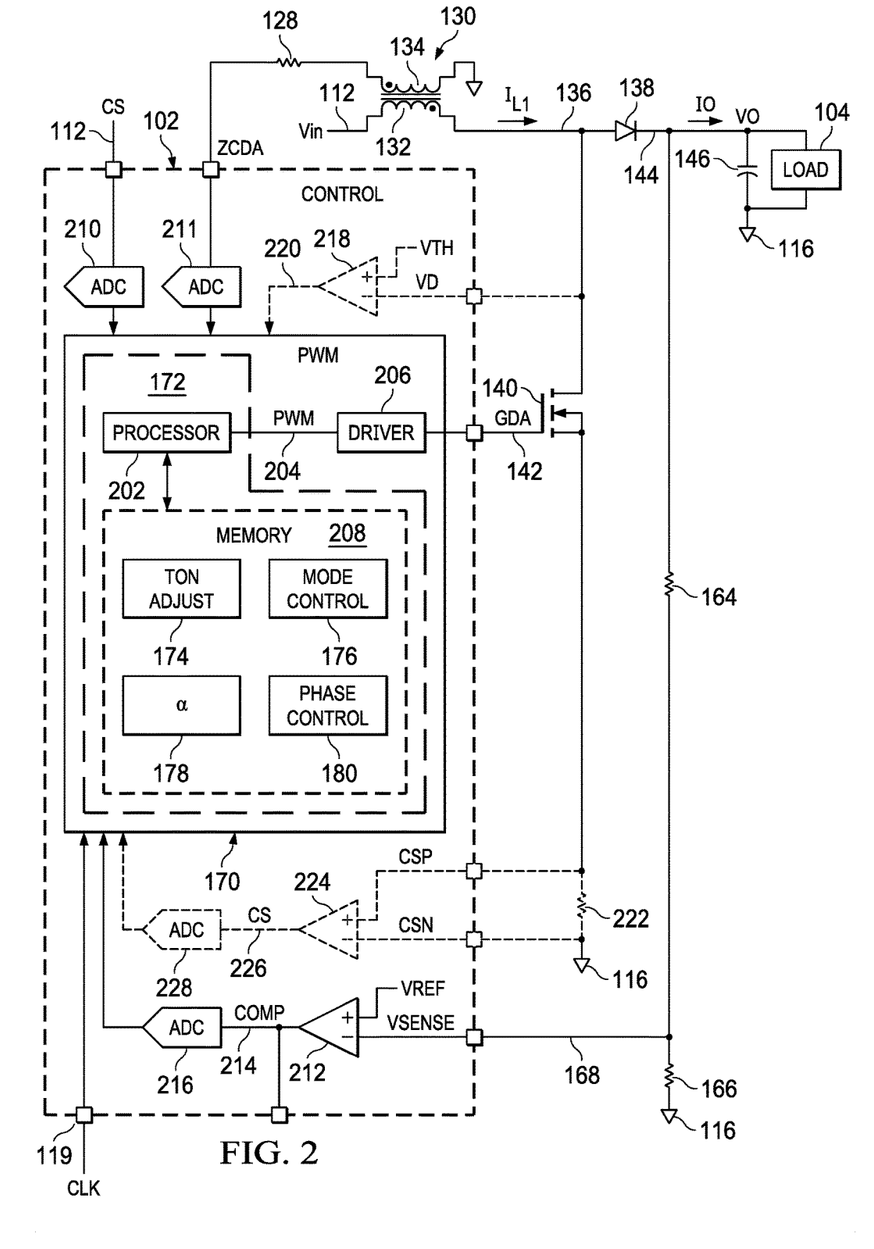
FIG. 2 is a schematic diagram showing further details of one phase control in the control circuit of FIG. 1.
Figure 3:
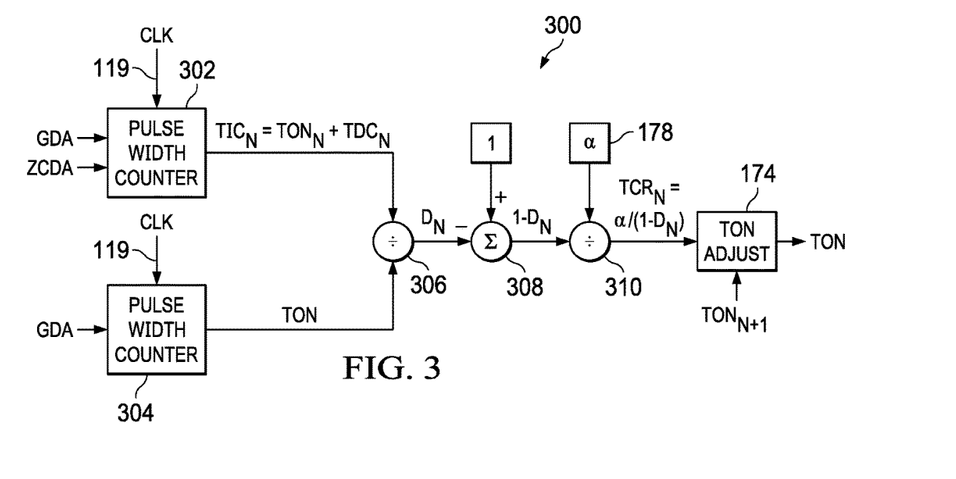
FIG. 3 is a simplified schematic diagram showing computation of a critical on time in the control circuit of FIGS. 1 and 2.
Figure 4:
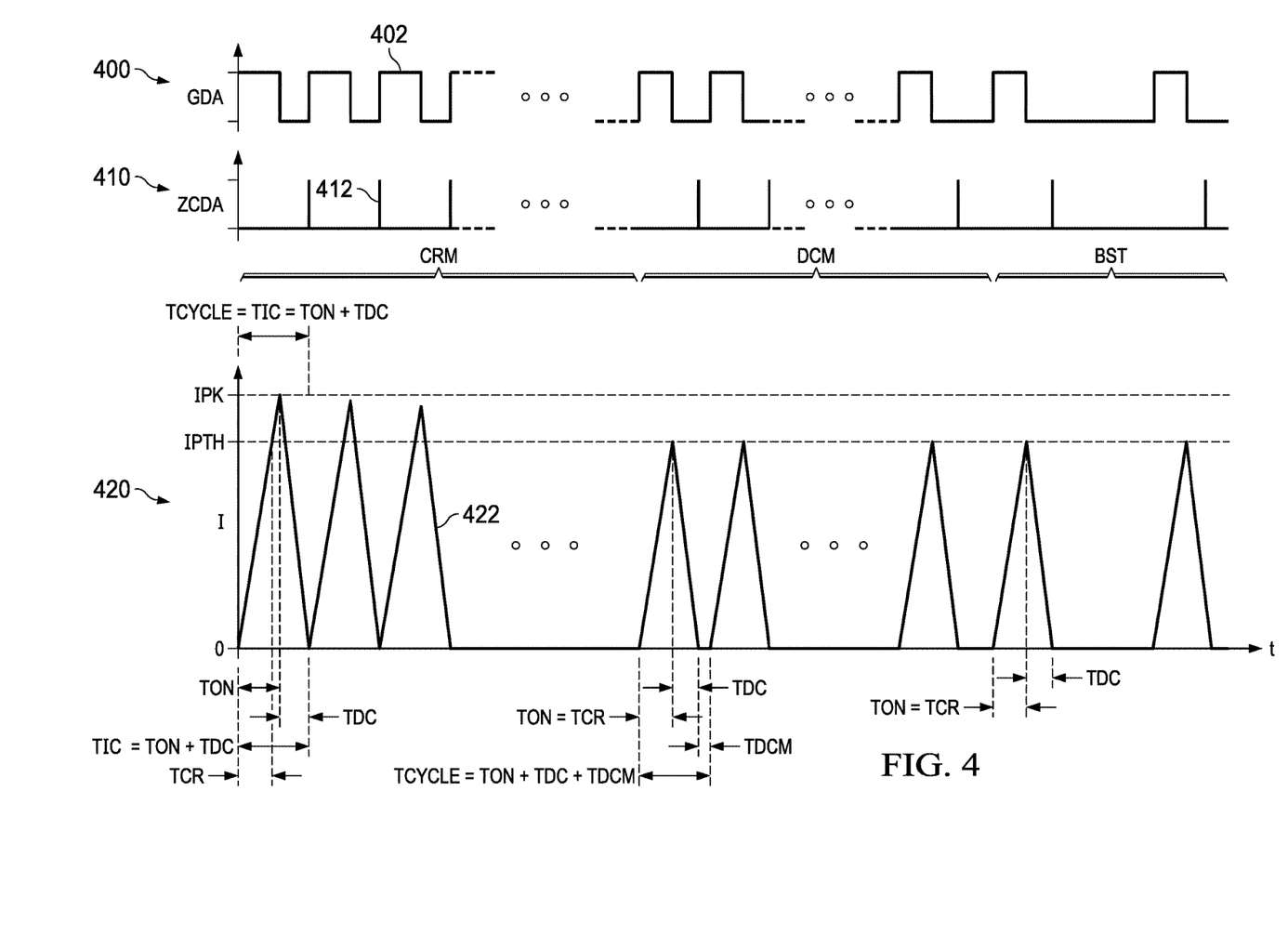
FIG. 4 is a graph of signals in the DC-DC converter of FIGS. 1-3.

Referring also to FIGS. 2-4, FIG. 2 shows further details of an example implementation of phase control for the first phase in the control circuit 102 of FIG. 1. FIG. 3 shows an example computation of a critical on time to switch between CRM and DCM operating modes in one counter-based implementation 300 of the control circuit 102. FIG. 4 provides graphs 400, 410 and 420 showing signals in the DC-DC converter 100 of FIGS. 1-3. FIG. 2 illustrates details for the first phase to operate the first switch 140. Similar circuitry can be used in multiphase implementations, for example, to operate the second switch 160 in FIG. 1. The PWM circuit 170 in one example includes the processing circuit 172 and a driver circuit 206. The example processing circuit 172 in FIG. 2 includes a processor 202 that provides a pulse width modulation signal (PWM) to the driver circuit 206. The driver circuit 206 in one example includes suitable circuitry, such as amplifiers, level shifters, etc., to generate the switching control signal GDA at the first switch control output 142 in order to selectively turn the transistor switch 140 on or off. As discussed above, in the illustrated example, the switch 140 is an n-channel MOSFET transistor, and the processing circuit 172 and the driver 206 are configured to provide an active high switching control signal GDA to turn the switch 140 on, and a low switching control signal GDA to turn the switch 140 off. The illustrated processing circuit 172 also includes an electronic memory 208 that stores data as well as firmware or software programming instructions executed by the processor 202 in operation of the control circuit 102. In this example, the memory 208 stores the predetermined value 178 (a), along with processor-executable instructions to implement the on time adjust component 174 and the mode control component 176. In certain implementations, the memory 208 also stores processor-executable instructions to implement the phase control component 180. In other examples, one or more of the on time adjust component 174, the mode control component 176 and/or the phase control component 180 can be implemented in dedicated hardware circuits (not shown).

As shown in FIG. 2, the control circuit example 102 includes a first analog to digital converter (ADC) circuit 210 that receives the current sense signal CS from the node 114 in FIG. 1. The control circuit 102 includes a second ADC 211 that receives the zero current detection signal ZCDA from the resistor 128. The control circuit 102 in this example also includes an amplifier 212 with a non-inverting (+) first input connected to receive the reference voltage signal VREF and an inverting (−) input connected to the node 168 to receive the output voltage feedback signal VSENSE. The amplifier 212 has an output 214 that provides the error signal COMP based on the difference between the reference signal and the sensed output voltage feedback signal. A third ADC 216 receives the COMP signal. The ADCs 210, 211 and 216 each convert the respective input signals into digital form and provide the corresponding digital signals or digital values to the processor 202 of the PWM circuit 170. The PWM circuit 170 and the various digital circuits thereof operate according to the clock signal CLK from the input node 119. As discussed above in connection with FIG. 1, the control circuit 102 in one example receives an inductor current feedback signal used for zero current detection (ZCDA) from a sense winding (secondary winding) 134 of the transformer 130. In another possible example, the control circuit 102 includes an input connected to the first switching node 136 to receive a voltage signal VD that represents the drain voltage of the MOSFET transistor switch 140. The control circuit 102 in this example also includes a comparator 218 with an input connected to receive the drain voltage signal VD, and another input connected to a threshold voltage signal VTH. The comparator 218 in this example includes an output 220 that provides a zero current detection signal (e.g., ZCDA) that indicates the time at which the drain voltage at the switching node 136 transitions through a threshold voltage level. The threshold voltage signal VTH is set to correspond to a drain voltage at which the corresponding boost converter inductor current $I_{L1}$ reaches a predetermined threshold, such as zero. This configuration advantageously mitigates the need for a sense coil 134 and a corresponding signal resistor 128 and the ADC 211, while allowing the control circuit 102 to make PWM control decisions for switching between CRM and DCM operating modes based on the inductor current $I_{L1}$. In another possible implementation, a sense resistor 222 is connected between the source of the transistor switch 140 and the reference node 116, and the control circuit 102 includes inputs to receive positive and negative current sense signals CSP and CSN, respectively, from the sense resistor 222. In this example, the control circuit 102 further includes an amplifier 224 that receives the current sense signals CSP and CSN as inputs. The amplifier 224 in this case includes an output 226 that provides the current sense signal CS to a corresponding ADC 228. The ADC 228 in this example converts the current sense signal CS to a digital value and provides the digital value to the processor 202 of the PWM circuit 170.

In certain examples, the PWM circuit 170 determines a cycle start time in each of a series of subsequent PWM switching control cycles in order to begin a new cycle by turning on the boost converter low side switch 140. In certain examples, the PWM circuit 170 monitors the converted digital value from the ADC 211, and begins a new switching cycle for CRM operation based on the ZCDA signal indicating that the inductor current $I_{L1}$ has reached a predetermined threshold, such as zero. In another example, the PWM circuit 170 monitors the Boolean comparator output from the comparator 218, and begins a new switching cycle for CRM operation based on a transition in the signal from the comparator output 220 indicating that the drain voltage VD of the low side switch transistor 140 has reached a predetermined threshold represented by the threshold voltage signal VTH. In certain examples, moreover, the PWM circuit 170 monitors the inductor current in order to detect transition to a predetermined peak current value by monitoring the converted current sense value from one of the ADCs 210, 218 while the switch 140 is turned on.

The processor 202 in certain examples uses the sensed inductor peak current indication for selective switch from CRM operation to DCM operation. In certain examples, the PWM circuit 170 causes the first switch control output 142 to provide the signal GDA in a second state (e.g., LOW) to turn the first switch 140 off in response to a first zero current detection signal ZCDA which indicates that an inductor current IL of the DC-DC converter 100 has reached zero in the successive switching control cycles. As discussed below, certain examples use CRM operation in which the PWM circuit 170 turns first switch 140 off as soon as the ZCDA signal indicates the inductor current has reached zero (i.e., upon the first zero current detection signal ZCDA indicating that the inductor current IL of the DC-DC converter 100 has reached zero). For DCM operation, the PWM circuit 170 waits an additional discontinuous mode off time $TDCM_{N+1}$ after the ZCDA signal indicates the inductor current has reached zero, and then turns the first switch 140 off for the cycle N+1. In one example, when $TON_{N+1}$ is less than TCRN, the PWM circuit 170 computes the additional discontinuous mode off time $TDCM_{N+1}$ according to the difference between the second time value $TON_{N+1}$ and the threshold time value $TCR_N$ and implements the cycle off-time in order to provide a desired amount of average inductor current to facilitate controlled regulation of the output voltage VO and the output current IO of the boost converter 100.

In the example of FIGS. 1 and 2, the PWM circuit 170 computes a threshold time value $TCR_N$ that corresponds to a predetermined peak inductor current IPTH and a duty cycle value DN for a first switching control cycle N, and computes a first time value $TON_{N+1}$ according to the error signal value COMP for a subsequent second switching control cycle N+1. The PWM circuit 170 sets a controlled on time TON to the first time value $TON_{N+1}$ to operate the first switch 140 in CRM for the second switching control cycle N+1 when the first time value $TON_{N+1}$ is greater than or equal to the threshold time value $TCR_N$. When the first time value $TON_{N+1}$ is less than the threshold time value $TCR_N$, the PWM circuit 170 sets the controlled on time TON to the threshold time value TCRN to operate the first switch 140 in DCM for the second switching control cycle N+1. Although illustrated and described in connection with operation of the first switch by the first switching control signal GDA, certain implementations of the control circuit 10 to provide similar operation for a second phase in CRM mode using the switch 160 and the second switching control signal GDB.

In this manner, the PWM circuit 170 enforces a minimum inductor peak current level in each switching control cycle according to the previous duty cycle and selectively switches between CRM and DCM operation. This control circuit example advantageously avoids or mitigates the shortcomings associated with increased high-frequency switching operation at lightly loaded operating conditions for the DC-DC converter 100. Moreover, the illustrated examples advantageously use the computed on-time adjustment via the adjustment component 174 and the mode control component 176 according to a predetermined value 178 (a) using a straightforward mode control architecture that does not require actual current sensing. For example, certain implementations use the drain voltage sensing via the amplifier 218 in FIG. 2 in order to detect zero inductor current conditions, and the separate current sense components 222, 224, 226, 228 and/or 128, 134 can be omitted in certain examples. The disclosed control circuit 102 facilitates intelligent, efficient mode control for transitioning between CRM and DCM operation in a cost-effective implementation.

FIG. 3 shows a counter-based circuit example 300 to implement on-time adjustment and CRM/DCM mode switching in the PWM circuit 170. In this example, the PWM circuit 170 includes a first counter 302 that counts the number of cycles of the clock signal CLK between a rising edge of the first switching control signal GDA and a rising edge of the zero current detection signal ZCDA indicating that the inductor current $I_{L1}$ of the DC-DC converter 100 has reached zero. The counter 302 outputs a first count value $TIC_N$ that represents the inductor conduction time for the first switching control cycle N. The inductor conduction time count value $TIC_N$ includes the on time of the converter switch 140 (TON) during which the inductor current $I_{L1}$ increases (e.g., charging time), as well as the discharge time TDC during which the inductor current $I_{L1}$ decreases to provide power to the output load 104 while the switch 140 is turned off ($TIC_N$=TON+TDC). A second counter 304 counts the number of CLK signal cycles during which the GDA signal is high in the switching control cycle N, and outputs a second count value TON that represents the controlled on time TON for the first switching control cycle N. A first divider 306 divides the value $TIC_N$ by the value TON, and outputs a PWM duty cycle value $D_N$ for the switching control cycle N. The circuit example 300 also includes a summing junction or subtractor 308 that subtracts the duty cycle value $D_N$ from 1 and provides an output 1−$D_N$ for the switching cycle N. A second divider 310 divides the predetermined value α (178) by the summer signal 1−$D_N$, and outputs the threshold time value $TCR_N$. The divider 310 provides the threshold value $TCR_N$ as an output to the on-time adjust circuit or component 174.

The computed threshold value $TCR_N$ corresponds to a predetermined peak indicator current value IPTH shown in the graph 420 of FIG. 4. The on-time adjust circuit or component 174 uses the threshold value $TCR_N$ to selectively adjust the on-time for the next switching cycle N+1, and to selectively switch between CRM and DCM operation of the boost converter 100. The on-time adjust circuit 174 sets the controlled on time TON for the next cycle N+1 to a smaller one of the threshold time value $TCR_N$ and the first time value $TON_{N+1}$. In this manner, the PWM circuit 170 enforces a minimum inductor peak current, and the on-time for a given switching control cycle ensures that the converter switch 140 will be turned on for at least the threshold time value $TCR_N$. The PWM circuit 170 selectively provides DCM time in a given switching cycles for DCM operation where the computed first time value $TON_{N+1}$ is less than the threshold time value $TCR_N$.

The graph 400 in FIG. 4 shows an example switching control signal curve 402 (GDA) and the graph 410 illustrates a curve 412 showing an example of the ZCDA signal. The graph 420 in FIG. 4 includes a curve 422 that represents the inductor current $I_{L1}$. The graphs 400, 410 and 420 in FIG. 4 respectively illustrate the curves 402, 412 and 422 as a function of time t during operation in CRM, DCM and first mode (BST) operation of the boost converter circuit 100. This example illustrates an operating situation where the output load current IO is steadily decreasing over time. During the illustrated CRM operation in FIG. 4, the control circuit 102 operates the switch 140 (and any included second phase switch 160) in critical conduction mode CRM. In the first illustrated cycle in the graph 420, the inductor current curve 422 rises while the switch 140 is turned on. In this example first cycle, the computed on-time for the first cycle is greater than the threshold value TCR. Accordingly, the control circuit 102 turns the switch off, and starts the next cycle upon the inductor current again reaching zero after the discharge time TDC. For the first cycle and subsequent cycles during the CRM operation, the cycle time TCYCLE is equal to the inductor conduction time TIC, and is equal to the sum of the on-time TON and the discharge time TDC (TCYCLE=TIC=TON+TDC). This condition remains true in the first three illustrated cycles in the graph 420, even though the on-time for each successive cycle is decreasing due to decreased output load current requirements in the converter 100.

As further shown in the DCM operating portion of FIG. 4, once the computed on-time TON for a given cycle is less than the threshold value TCR, the control circuit 102 adds a non-zero DCM time TDCM at the end of the cycle. In this condition, the cycle time TCYCLE is equal to the inductor conduction time TIC plus the non-zero DCM time TDCM (TCYCLE=TIC+TDCM=TON+TDC+TDCM). During this DCM operating mode, the control circuit 102 provides the switching control signal GDA with a DCM time TDCM computed according to the difference between the threshold time value $TCR_N$ and the first time value $TON_{N+1}$. In this example, the DCM time is increased with increasing difference between the computed on-time and the threshold value. Although not illustrated in FIG. 4, the operation of the time adjust component or circuit 174 provides an automatic mechanism to selectively transition back and forth between CRM and DCM operation as needed in order to enforce the minimum on-time threshold. In each switching control cycle, the control circuit 102 reevaluates whether the first time value is greater than or less than the threshold value, and selects CRM or DCM operation accordingly.

The control circuit 102 in one example computes the first time value $TON_{N+1}$ for a given control cycle based on the closed-loop regulation of the output voltage VO, for example, according to the output voltage feedback sense signal VSENSE and the desired set point operating level according to the reference voltage signal VREF. In other examples, the first time value $TON_{N+1}$ is computed for a given cycle based on one or more other factors, for example, in order to implement peak or valley algorithms, and/or in consideration of any PFC control goals for the DC-DC converter 100. As seen in the example counter-based circuit implementation 300 of FIG. 3, moreover, the use of the predetermined value 178 (a) allows the minimum inductor current peak value threshold IPTH to be set to any desired value. This allows optimization of the efficiency for a given DC-DC converter circuit 100. In one example, moreover, the selective switching between DCM and CRM operation is done for both the phases of a dual-phase implementation (e.g., FIG. 1), in which the control circuit 102 provides the first and second switching control signals GDA and GDB in interleaved fashion at a relative 180° phase relationship to one another. In another possible implementation, as discussed below in connection with FIGS. 6 and 7, the control circuit 102 can implement a multi-phase DC-DC converter circuit 100 in which operation of one of the phases (e.g., the second phase) is selectively stopped as the output load requirement decreases.

Figure 5:
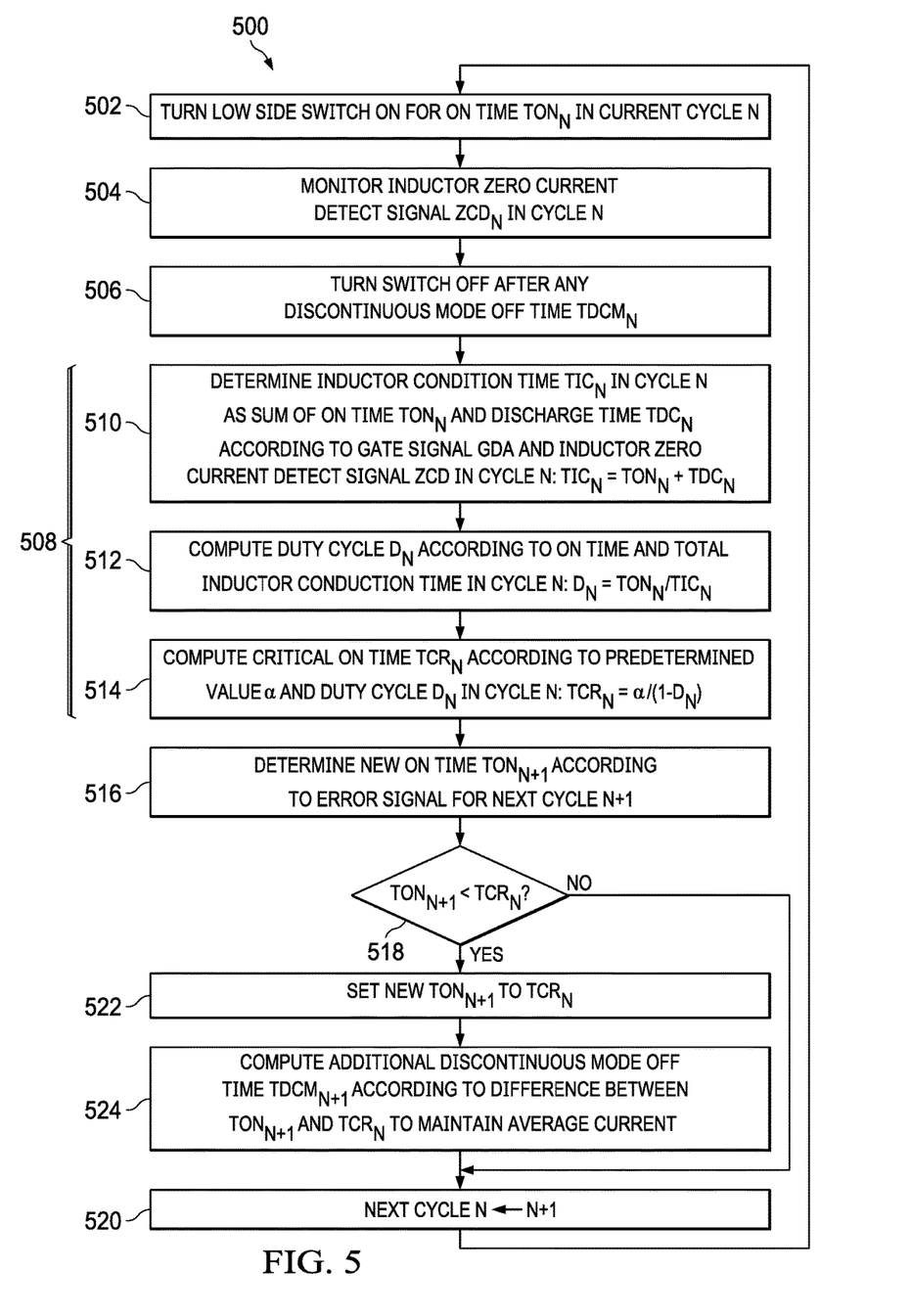
FIG. 5 is a flow diagram of a method of operating a DC-DC converter in CRM and DCM modes according to peak current.

Referring also to FIG. 5, one example of the selective CRM/DCM is illustrated for an example switching control cycle. FIG. 5 shows a method 500 to operate a DC-DC converter in CRM and DCM modes according to peak current. In one possible implementation, the processor 202 in FIG. 2 implements program instructions stored in the electronic memory 208, shown in FIG. 2 as the on-time adjust component 174. In other implementations, the method 500 can be implemented in hardware and/or combinations of hardware and/or processor-executed software (e.g., using a counter-based circuit as shown in FIG. 3). The method 500 begins at 502, including the control circuit 102 turning the low side switch 140 on for the on time $TON_N$ of the present switching control cycle N. The control circuit 102 monitors the inductor zero current detection condition in the present cycle N at 504 (e.g., signal ZCDA or the current sense input CS). In certain examples, the first switch 140 is turned off in response to the first zero current detection signal ZCDA in the successive switching control cycles. The method 500 further includes turning the switch 140 off for a controlled off time at 506 (e.g., discharge time TDC plus any discontinuous mode time TDCM). The controlled switching at 502-506 in successive switching control cycles controls the transfer of power between the input node 112 and the output node 144 in the converter 100 described above.

The method 500 also includes computing a threshold time value TCRN at 508, which corresponds to a predetermined peak inductor current IPTH (FIG. 4) and a duty cycle value $D_N$ for the present switching control cycle N. The threshold time value computation in one example is performed by the processor 202 executing program instructions stored in the memory 208 in FIG. 2. In another example, the threshold time value is computed by dedicated hardware, such as the counters, summers and dividers shown in FIG. 3. Various other embodiments are possible including processor executed instructions in combination with hardware circuitry. In one example, the computation at 508 includes determining the inductor conduction time in the present cycle N as the sum of the on-time $TON_N$ of the present cycle and the discharge time $TDC_N$ of the present cycle N. In the example of FIG. 5, the inductor conduction time is determined at 510 according to the gate signal GDA and the inductor zero current detect signal ZCDA in the cycle N. In one example, the inductor conduction time is determined at 510 as the first count value $TIC_N$ as described above in connection with FIG. 3, which represents the inductor conduction time for the first switching control cycle N. The on-time $TON_N$ corresponds to the active (e.g., high state) time of the switching control signal GDA, and the discharge time TDCN is the time between the GDA signal going low and the rising edge of the inductor zero current detect signal ZDCA in the cycle N. In terms of CLK signal cycles, the determined inductor conduction time $TIC_N=TON_N+TDC_N$. As previously mentioned, the inductor conduction time $TIC_N$ is equal to the cycle time TCYCLE for CRM operation in the cycle N. If the control circuit 102 implements DCM for the present cycle N, the inductor conduction time $TIC_N$ less than the cycle time TCYCLE.

The determination 508 in FIG. 5 further includes computing the duty cycle $D_N$ of the present control cycle N at 512 according to the on time $TON_N$ and the determined inductor conduction time $TIC_N$. In one example, the control circuit processor 202 in FIG. 2 computes the duty cycle $D_N$ as the ratio $TON_N/TDC_N$. In another example, the divider 306 in FIG. 3 divides $TON_N$ by $TDC_N$ and outputs the duty cycle value $D_N$. In the example of FIG. 5, the computation at 508 further includes computing a critical on-time at 514 according to the predetermined value α and the duty cycle value $D_N$ computed at 512. In one example, the processor 202 computes the critical on-time value $TCR_N$ for the present cycle N at 514 as $TCR_N=\alpha/(1-D_N)$. In the example of FIG. 3, the divider 310 divides the predetermined value 178 (a) by $1-D_N$ and outputs the critical on-time value $TCR_N$.

As shown at 516 in FIG. 5, the method 500 further includes determining the new first time value $TON_{N+1}$ for the next switching control cycle N+1 at 516 according to an error value (e.g., COMP). In one example, the control circuit 102 includes the amplifier 212 (FIG. 2) that compares the reference voltage signal VREF with the output voltage feedback signal VSENSE and outputs the error signal COMP. The ADC 216 in this example converts the error signal to a digital value COMP, and the processor 202 computes the first time value $TON_{N+1}$ for the next switching control cycle N+1 according to the COMP signal value in order to regulate the output voltage VO and/or the output current IO of the converter 100.

The method 500 further includes setting the controlled on time TON and the controlled off time TDC+TDCM for the second switching control cycle N+1 for critical conduction mode CRM operation or discontinuous conduction mode DCM according to the threshold time value $TCR_N$ and the first time value $TON_{N+1}$. In the example of FIG. 3, the on-time adjust component or circuit 174 receives the first time value $TON_{N+1}$ (e.g., from the processor 202) and the computed threshold time value $TCR_N$ and sets the on time for the next cycle accordingly. In certain examples, the processor 202 sets the controlled on time TON and the controlled off time TDC+TDCM for the second switching control cycle N+1 according to the computed first time value $TON_{N+1}$ and the computed threshold time value $TCR_N$ at 508-524 in FIG. 5. In the illustrated example, these values are compared, and a determination is made at 518 as to whether the first time value $TON_{N+1}$ is less than the threshold time value $TCR_N$. If not (NO at 518), the method 500 includes setting the controlled on time TON to the first time value $TON_{N+1}$ at 520 to operate the first switch 140 in the next cycle without adjusting the on-time $TON_{N+1}$. This provides for CRM operation in the next switching control cycle N+1. When the first time value $TON_{N+1}$ is less than the threshold time value $TCR_N$ (YES at 518), the method 500 proceeds to 522 and 524 to set the controlled on time TON to the threshold time value $TCR_N$ to operate the first switch 140 in DCM for the second switching control cycle N+1. At 522, the processor 202 sets the new on-time $TON_{N+1}$ to the threshold time value $TCR_N$, and the processor 202 computes the additional discontinuous mode off time $TDCM_{N+1}$ at 524 according to the difference between the first time value $TON_{N+1}$ and the threshold time value $TCR_N$ (e.g., according to ($TON_{N+1}-TCR_N$)). In one example, the processor 202 computes the additional DCM time $TDCM_{N+1}$ at 524 in order to control the average inductor current $I_{L1}$ in the converter 100.

Although illustrated and described above with respect to single phase operation, the process 500 in one example can be implemented for two-phase or other multi-phase converters, with the second and other switches being controlled for the on time and controlled off time, where the multiple phases can be operated in interleaved (e.g., phase shifted) manner, with the control circuit 102 selectively adjusting the controlled on time for each of the phases according to the computed critical on-time for selective operation in CRM or DCM modes. In certain implementations, the control circuit 102 implements CRM or DCM operating modes according to the critical on-time $TCR_N$ computed in each control cycle, and maintains dual phase operation in the CRM or DCM mode on a cycle by cycle basis.

Figure 6:
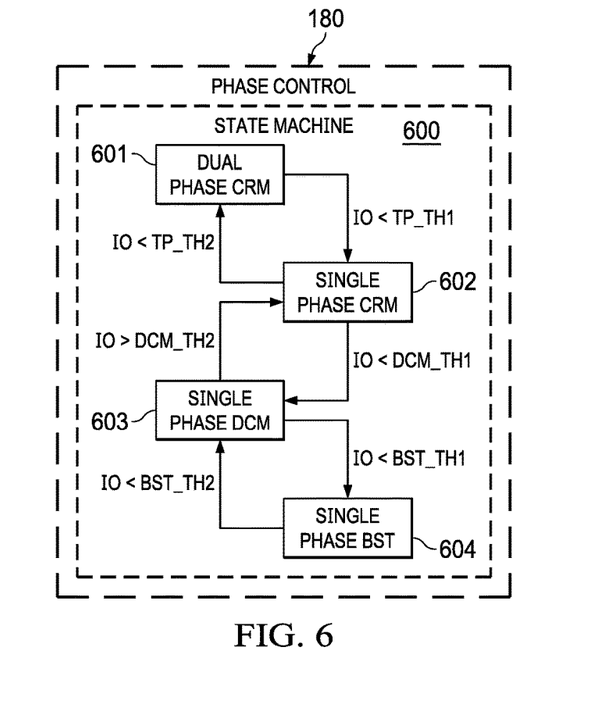
FIG. 6 is a state diagram showing operation of the dual phase DC-DC converter of FIG. 1 in different modes according to load.
Figure 7:
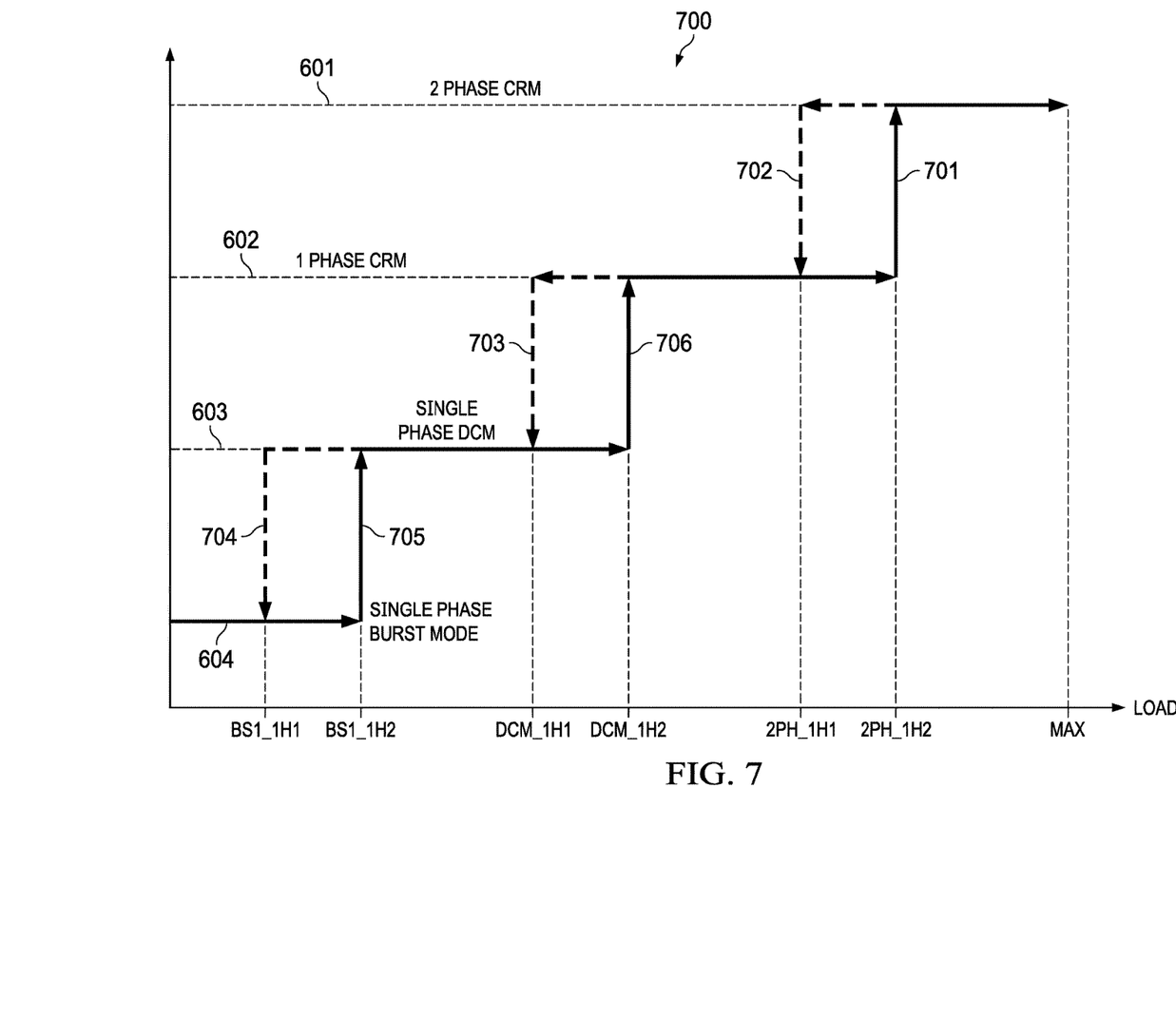
FIG. 7 is a graph showing operation of the DC-DC converter of FIG. 1 in the modes of FIG. 6 according to load.

Referring now to FIGS. 6 and 7, in certain implementations, the control circuit 102 provides selective shut off of the second phase according to loading conditions (selective phase shedding) for efficiency improvement at lighter loading conditions. In one implementation, the control circuit 102 operates in one of four modes 601, 602, 603 or 604 as illustrated in FIGS. 6 and 7 based on the output current IO, and selectively changes operation of the first phase between CRM and DCM according to the computed threshold time value $TCR_N$ generally as described above. In this implementation, the control circuit 102 selectively turns off the second phase and implements single phase operation in the modes 602-604. In other implementations, the control circuit 102 implements dual phase CRM operation in the first mode 601, and thereafter implements single phase operation in CRM, DCM or burst mode (BST) in the modes 602-604 for lighter output loading conditions according to output loading thresholds 701-706 as described below.

FIG. 6 shows an example state machine implementation 600 of the phase control component 180, where the processor 202 (FIG. 2) executes the program instructions stored in the electronic memory 208 to implement the state machine 600. This example includes a first operating mode 601 in which the control circuit 102 implements dual phase CRM operation to actively operate the first and second switches 140 and 160 using interleaved (e.g., 180° phase shifted) pulse width modulation switching control signals GDA and GDB. In a second operating mode 602, the control circuit 102 implements single phase CRM operation using pulse width modulated switching control signals GDA to operate the first switch 140, and the control circuit turns the second switch 160 off. In a third mode 603, the control circuit 102 implements single phase DCM operation of the converter 100, while maintaining the second switch 160 off. In one example, the control circuit 102 switches between the second and third modes (single phase CRM and single phase DCM) using a cycle-by-cycle critical on-time computation procedure as described above in connection with FIGS. 1-5). This implementation effectively re-computes switching thresholds each cycle for transitions between the second and third modes 602 and 603. In another example, the control circuit 102 switches between the second and third modes 602 and 603 based on predetermined loading thresholds. In a fourth mode 604, the control circuit 102 keeps the second switch 160 off and implements single phase burst mode operation (BST) during which one or more control cycles are effectively skipped by keeping both switches 140 and 160 off. This is shown in the "BST" portion of the graphs 400, 410 and 420 in FIG. 4. In the illustrated example, moreover, the control circuit 102 selectively switches between the modes 601-604 according to output current threshold levels, including operating in the first mode 601 for relatively high loading conditions, and transition through the modes 602-604 for decreasing loads.

In one example, the control circuit 102 implements the state machine 600 in the modes 601-604 according to output current loading thresholds 701-706 as shown in FIG. 7. FIG. 7 includes a graph 700 that shows operation of the DC-DC converter of FIG. 1 in the modes of FIG. 6 is a function of load. The control circuit in one example implements the thresholds 701-706 with respect to the output voltage feedback signal VSENSE. In another example, the control circuit 102 implements the thresholds 701-706 with respect to output current IO, for example, using the current sense feedback signal CS. FIG. 7 illustrates the control operation in graphical form as a function of feedback compensation voltage. The multiphase control state machine 600 can be used alone or in combination with the above-described on-time adjustment component 174 in various examples. In operation, the phase shedding provides improves light load efficiency due to reduced switching losses, and single phase DCM operation in mode 603 provides better efficiency than single phase CRM operation below the threshold 706. In particular, single phase DCM operation in the mode 603 provides substantial improvements in efficiency over conventional single phase converters with a simple frequency clamp. The state machine implementation 600 advantageously operates the converter 100 as a 2 phase CRM PFC in heavy load conditions, and as a single phase CRM/DCM converter when the power supply system operates at lighter loads. This allows the power supply to operate under the optimal operating conditions under all load conditions. In this example, moreover, the avoidance of dual phase DCM operation mitigates audible noise and electromagnetic interference (EMI).

At higher loads above the first threshold 701, the control circuit 102 operates the first and second switches 140, 160 concurrently in a first mode 601 for dual phase CRM operation while the output load current IO is above a first threshold 701 (2PH_TH2 in FIGS. 6 and 7). In response to the load transitioning below a second threshold 702 (2PH_TH1) threshold, the control circuit 102 operates the converter 100 in single phase CRM mode 602. In response to the load transitioning below a third threshold 703 (DCM_TH1), the control circuit 102 operates the converter 100 in the third mode 603 for single phase DCM operation. In response to the load transitioning below a fourth threshold 704 (BST1_TH), the control circuit 102 operates in burst mode 604 during which one or more control cycles are effectively skipped by keeping both switches 140 and 160 off. In response to the output load transitioning above a fifth threshold 705 (BST_TH2), the control circuit 102 operates in the third mode 603. In response to the load transitioning above a sixth threshold 706 (DCM_TH2), the control circuit 102 operates in the second mode 602. In addition, the control circuit 102 operates in the first mode 601 in response to the output load transitioning above the first threshold 701. In the illustrated example, the second threshold 702 is less than the first threshold 701, the sixth threshold 706 is less than the second threshold 702, and the third threshold 703 is less than the sixth threshold 706. Moreover, the fifth threshold 705 is less than the third threshold 703, and the fourth threshold 704 is less than the fifth threshold 705. This provides a non-zero amount of hysteresis in the mode switching. In certain examples, the PWM circuit 170 computes the third and sixth thresholds 703, 706 in each of the successive switching control cycles during operation in the second and third modes 602, 603 according to the predetermined peak inductor current IPTH, the duty cycle value $D_N$, and the error value COMP, to implement the above-described single phase DCM/CRM mode switching.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A control circuit to operate a DC-DC converter, the control circuit comprising:
   a first switch control output configured to provide a first switching control signal in a first state to turn a first switch on for a controlled on time and then provide the first switching control signal in a second state to turn the first switch off for a controlled off time in successive switching control cycles to control transfer of power between an input node and an output node;
   a pulse width modulation (PWM) circuit configured to:
      compute a threshold time value corresponding to a predetermined peak inductor current and a duty cycle value for a first switching control cycle,
      compute a first time value according to an error value for a subsequent second switching control cycle, and
      set the controlled on time to the first time value to operate the first switch in a critical conduction mode for the second switching control cycle when the first time value is greater than or equal to the threshold time value, and
      set the controlled on time to the threshold time value to operate the first switch in a discontinuous conduction mode for the second switching control cycle when the first time value is less than the threshold time value.

2. The control circuit of claim 1, wherein the PWM circuit is further configured to cause the first switch control output to provide the first switching control signal in the second state to turn the first switch off in response to a first zero current detection signal which indicates that an inductor current of the DC-DC converter has reached zero in the successive switching control cycles.

3. The control circuit of claim 2, wherein the PWM circuit is further configured to:
   when the first time value is greater than or equal to the threshold time value, cause the first switch control output to provide the first switching control signal in the second state to turn the first switch off upon the first zero current detection signal indicating that the inductor current of the DC-DC converter has reached zero in the critical conduction mode for the second switching control cycle;
   when the first time value is less than the threshold time value, compute an additional discontinuous mode off time for the second switching control cycle according to a difference between the second time value and the threshold time value; and
   when the first time value is less than the threshold time value, cause the first switch control output to provide the first switching control signal in the second state to turn the first switch off the additional discontinuous mode off time after the first zero current detection signal indicates that the inductor current of the DC-DC converter has reached zero in the discontinuous conduction mode for the second switching control cycle.

4. The control circuit of claim 2, wherein the PWM circuit includes:
   a first counter configured to count a number of cycles of a clock signal between the first switch control output providing the first switching control signal in the first state and the first zero current detection signal indicating that the inductor current of the DC-DC converter has reached zero, and to output a first count value that represents an inductor conduction time for the first switching control cycle;
   a second counter configured to count a number of cycles of the clock signal during which the first switch control output provides the first switching control signal in the first state in the first switching control cycle, and to output a second count value that represents the controlled on time for the first switching control cycle;

a first divider configured to divide the first count value by the second count value, and to output the duty cycle value for the first switching control cycle;

a subtractor configured to subtract the duty cycle value from 1, and to output a summer signal;

a second divider configured to divide a predetermined value by the summer signal, and to output the threshold time value; and an on-time adjust circuit configured to set the controlled on time to a smaller one of the threshold time value and the first time value for the second switching control cycle.

5. The control circuit of claim 1, wherein the PWM circuit is further configured to:

when the first time value is greater than or equal to the threshold time value, cause the first switch control output to provide the first switching control signal in the second state to turn the first switch off upon a first zero current detection signal indicating that the inductor current of the DC-DC converter has reached zero in the critical conduction mode for the second switching control cycle;

when the first time value is less than the threshold time value, compute an additional discontinuous mode off time for the second switching control cycle according to a difference between the second time value and the threshold time value; and when the first time value is less than the threshold time value, cause the first switch control output to provide the first switching control signal in the second state to turn the first switch off the additional discontinuous mode off time after the first zero current detection signal indicates that the inductor current of the DC-DC converter has reached zero in the discontinuous conduction mode for the second switching control cycle.

6. The control circuit of claim 1, further comprising:

a second switch control output configured to provide a second switching control signal in a first state to turn a second switch on for the controlled on time and then provide the second switching control signal in a second state to turn the second switch off for the controlled off time in the successive switching control cycles to control transfer of power between the input node and the output node; and a phase control circuit configured to:

operate the first and second switches concurrently in a first mode for dual phase critical conduction mode operation while an output load current is above a first threshold, in response to the output load current transitioning below a second threshold, turn the second switch off, and operate the first switch in a second mode for single phase critical conduction mode operation, the second threshold being less than the first threshold, in response to the output load current transitioning below a third threshold, keep the second switch off, and operate the first switch in a third mode for single phase discontinuous conduction mode operation, the third threshold being less than the second threshold, and in response to the output load current transitioning below a fourth threshold, keep the second switch off, and operate the first switch in a fourth mode for single phase burst mode operation to skip at least one of the successive switching control cycles, the fourth threshold being less than the third threshold.

7. The control circuit of claim 1, wherein the phase control circuit is further configured to:

in response to the output load current transitioning above a fifth threshold, keep the second switch off, and operate the first switch in the third mode, the fifth threshold being between the third and fourth thresholds, in response to the output load current transitioning above a sixth threshold, keep the second switch off, and operate the first switch in the second mode, the sixth threshold being between the second and third thresholds, and in response to the output load current transitioning above the first threshold, operate the first and second switches concurrently in the first mode.

8. The control circuit of claim 1, wherein the first switch control output is configured to provide the first switching control signal to operate the first switch as a low side switch of a boost DC-DC converter.

9. A control circuit to operate a DC-DC converter, the control circuit comprising:

a first switch control output configured to provide a first switching control signal in a first state to turn a first switch on for a controlled on time and then provide the first switching control signal in a second state to turn the first switch off for a controlled off time in successive switching control cycles to control transfer of power between an input node and an output node;

a second switch control output configured to provide a second switching control signal in a first state to turn a second switch on for the controlled on time and then provide the second switching control signal in a second state to turn the second switch off for the controlled off time in the successive switching control cycles to control transfer of power between the input node and the output node; and a phase control circuit configured to:

operate the first and second switches concurrently in a first mode for dual phase critical conduction mode operation while an output load current is above a first threshold, in response to the output load current transitioning below a second threshold, turn the second switch off, and operate the first switch in a second mode for single phase critical conduction mode operation, the second threshold being less than the first threshold, in response to the output load current transitioning below a third threshold, keep the second switch off, and operate the first switch in a third mode for single phase discontinuous conduction mode operation, the third threshold being less than the second threshold, and in response to the output load current transitioning below a fourth threshold, keep the second switch off, and operate the first switch in a fourth mode for single phase burst mode operation to skip at least one of the successive switching control cycles, the fourth threshold being less than the third threshold.

10. The control circuit of claim 9, wherein the phase control circuit is further configured to:

in response to the output load current transitioning above a fifth threshold, keep the second switch off, and operate the first switch in the third mode, the fifth threshold being between the third and fourth thresholds, in response to the output load current transitioning above a sixth threshold, keep the second switch off, and operate the first switch in the second mode, the sixth threshold being between the second and third thresholds, and in response to the output load current transitioning above the first threshold, operate the first and second switches concurrently in the first mode.

11. The control circuit of claim 10, further comprising a pulse width modulation (PWM) circuit configured to compute the third and sixth thresholds in each of the successive switching control cycles during operation in the second and third modes according to a predetermined peak inductor current, a duty cycle value, and an error value.

12. The control circuit of claim 11, wherein the PWM circuit is configured, during operation in the second and third modes, to:

compute a threshold time value corresponding to the predetermined peak inductor current and the duty cycle value for a first switching control cycle;

compute a first time value according to the error value for a subsequent second switching control cycle; and set the controlled on time to the first time value to operate the first switch in the second mode for the second switching control cycle when the first time value is greater than or equal to the threshold time value; and set the controlled on time to the threshold time value to operate the first switch in the third mode for the second switching control cycle when the first time value is less than the threshold time value.

13. The control circuit of claim 12, wherein the PWM circuit is further configured, during operation in the second and third modes, to cause the first switch control output to provide the first switching control signal to turn the first switch off in response to a first zero current detection signal which indicates that an inductor current of the DC-DC converter has reached zero in the successive switching control cycles.

14. The control circuit of claim 12, wherein the PWM circuit is further configured to:

when the first time value is greater than or equal to the threshold time value, cause the first switch control output to provide the first switching control signal in the second state to turn the first switch off upon the first zero current detection signal indicating that the inductor current of the DC-DC converter has reached zero in the second mode for the second switching control cycle;

when the first time value is less than the threshold time value, compute an additional discontinuous mode off time for the second switching control cycle according to a difference between the second time value and the threshold time value; and when the first time value is less than the threshold time value, cause the first switch control output to provide the first switching control signal in the second state to turn the first switch off the additional discontinuous mode off time after the first zero current detection signal indicates that the inductor current of the DC-DC converter has reached zero in the third mode for the second switching control cycle.

15. The control circuit of claim 9, wherein the first switch control output is configured to provide the first switching control signal to operate the first switch as a first low side switch of a boost DC-DC converter, and wherein the second switch control output is configured to provide the second switching control signal to operate the second switch as a second low side switch of the boost DC-DC converter.

16. A method to operate a DC-DC converter, the method comprising:

turning a first switch on for a controlled on time, and turning the first switch off for a controlled off time in successive switching control cycles to control transfer of power between an input node and an output node;

computing a threshold time value corresponding to a predetermined peak inductor current and a duty cycle value for a first switching control cycle;

computing a first time value according to an error value for a subsequent second switching control cycle; and setting the controlled on time and the controlled off time for the second switching control cycle for critical conduction mode operation or discontinuous conduction mode according to the threshold time value and the first time value.

17. The method of claim 16, wherein setting the controlled on time and the controlled off time for the second switching control cycle includes:

setting the controlled on time to the first time value to operate the first switch in a critical conduction mode for the second switching control cycle when the first time value is greater than or equal to the threshold time value; and setting the controlled on time to the threshold time value to operate the first switch in a discontinuous conduction mode for the second switching control cycle when the first time value is less than the threshold time value.

18. The method of claim 17, further comprising:

monitoring a first zero current detection signal which indicates that an inductor current of the DC-DC converter has reached zero in the successive switching control cycles; and turning the first switch off in response to the first zero current detection signal in the successive switching control cycles.

19. The method of claim 16, further comprising:

turning a second switch on for the controlled on time, and turning the second switch off for the controlled off time in the successive switching control cycles to control transfer of power between the input node and the output node;

operating the first and second switches concurrently in a first mode for dual phase critical conduction mode operation while an output load current is above a first threshold;

in response to the output load current transitioning below a second threshold, turning the second switch off, and operating the first switch in a second mode for single phase critical conduction mode operation, the second threshold being less than the first threshold;

in response to the output load current transitioning below a third threshold, keeping the second switch off, and operating the first switch in a third mode for single phase discontinuous conduction mode operation, the third threshold being less than the second threshold; and in response to the output load current transitioning below a fourth threshold, keeping the second switch off, and operating the first switch in a fourth mode for single phase burst mode operation to skip at least one of the successive switching control cycles, the fourth threshold being less than the third threshold.

20. The method of claim 19, further comprising:

in response to the output load current transitioning above a fifth threshold, keeping the second switch off, and operating the first switch in the third mode, the fifth threshold being between the third and fourth thresholds, in response to the output load current transitioning above a sixth threshold, keeping the second switch off, and operating the first switch in the second mode, the sixth threshold being between the second and third thresholds, and in response to the output load current transitioning above the first threshold, operating the first and second switches concurrently in the first mode.

* * * * *